Aug. 23, 1932.  M. MATSEN  1,873,931
STORAGE BATTERY CONNECTER AND METHOD OF MAKING THE SAME
Filed Oct. 4, 1927
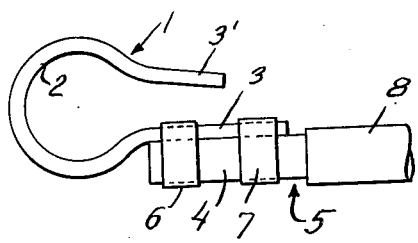
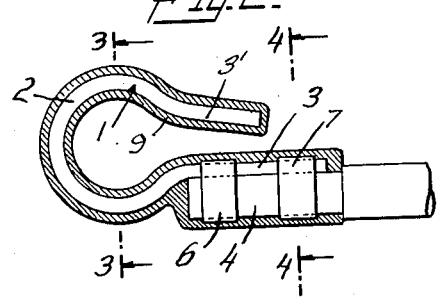
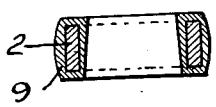
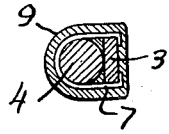
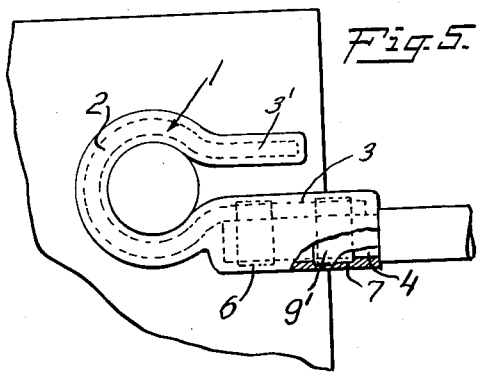
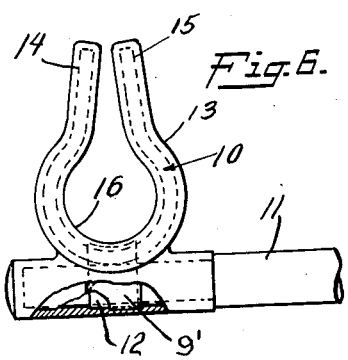
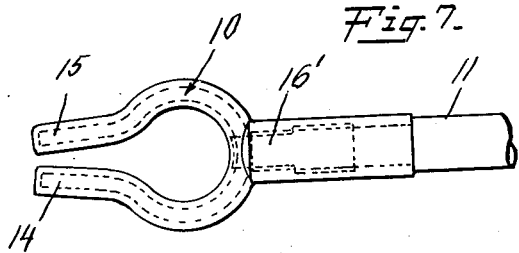
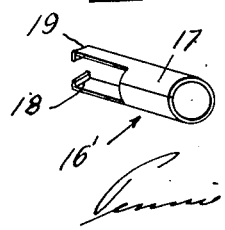
INVENTOR
Morris Matsen
BY
ATTORNEYS Patented Aug. 23, 1932

1,873,931

UNITED STATES PATENT OFFICE

MORRIS MATSEN, OF OREGON, WISCONSIN

STORAGE BATTERY CONNECTER AND METHOD OF MAKING THE SAME

Application filed October 4, 1927. Serial No. 223,873.

My invention relates to storage battery connecters and to methods of making such connecters, one of the principal objects of my invention being to provide an efficient and inexpensive storage battery connecter of small dimensions and adapted to be applied to storage batteries without employing any screw-threaded securing means.

In general, my invention comprises a spring member adapted to engage a storage battery terminal upon being released from a flexed position, this member being protected by an acid resisting sheath which may cover not only the spring member per se, but the cable or other conductor carrying the spring member and any means which may be employed for securing the spring member to the conductor.

The battery connecters heretofore employed, particularly in connection with automobile storage batteries, are ordinarily of the type employing screw threaded securing means. Such securing means are objectionable because if the screw threaded parts are made out of an acid resisting metal such as lead, the threads are easily destroyed, even though the lead has been hardened to some extent. On the other hand, if the screw threaded parts are made out of iron or steel, the acid from the battery causes them to corrode to such an extent as to destroy their usefulness. Hard acid resisting alloys, although suitable for making screw threaded connections, are usually so expensive as to make this practice prohibitive. According to my invention, all screw threaded connections are eliminated, and this without impairing the efficiency of the connection as a conductor of electric current.

It has been proposed heretofore to provide spring clips for storage battery terminals, the portions actually engaging the terminals being protected by lead jaws, and the spring action taking place in a part of the device remote from the battery terminal, and where there is little danger of corrosion by the acid of the battery. Such devices are bulky, expensive to manufacture and not suitable for use on automobiles.

I have found that a very satisfactory storage battery connecter, particularly suitable for use on automobiles, can be made by providing an approximately U-shaped spring member secured to the end of a conductor cable, that portion of the spring member which actually engages the battery terminal being flexible and supplying all of the tension required to form a firm contact offering very little resistance to the flow of current. This spring member is provided with an acid resisting sheath, preferably of soft metal such as lead, and the spring tension of the member is of sufficient magnitude to bend the lead sheath readily whenever the spring member is released from a flexed position, as in applying the same to the storage battery terminal. Any tendency of the acid resisting sheath to separate from the underlying spring member when the latter is bent or flexed, can be overcome by bonding the metal sheath firmly to the spring member. For example, the spring member may be coated with tin and then the lead covering may be applied by dipping the member in molten lead or molding the lead on to the member. The hot lead melts the tin which alloys with some of the lead to form a solder firmly bonding the sheath to the spring member.

The various objects and advantages of my invention will be more apparent upon considering the following detailed description, which is to be taken in conjunction with the accompanying drawing, in which Figure 1 is an elevation of a partially completed connecter comprising one embodiment of my invention;

Figure 2 is a vertical section view of a completed connecter of the form shown in Figure 1;

Figure 3 is a transverse section view taken on line 3—3 of Figure 2, showing details of construction;

Figure 4 is a transverse section view taken on line 4—4 of Figure 2, showing details of construction;

Figure 5 is a fragmentary plan view of a storage battery showing one form of the improved connecter applied to a terminal thereof;

Figure 6 is a plan view of another embodiment of my invention;

Figure 7 is a plan view of still another embodiment of my invention; and

Figure 8 is a perspective view of a securing means forming a part of the device of Figure 7.

Referring to Figures 1 to 5, inclusive, of the accompanying drawing, the embodiment of my invention there illustrated comprises a spring member 1, made by forming a piece of strip spring steel into an approximately U-shaped member having a curved portion 2 adapted to encircle a storage battery terminal. One arm 3 of the U-shaped member is shown fastened to an end 4 of a conductor or cable 5 by means of suitable fastening clips or bands 6 and 7. The conductor 5 may be of the usual cable type provided with an insulating covering 8, or in fact this conductor may be of any form suitable for use in connection with storage batteries. That portion of the conductor carrying the spring member is preferably uninsulated and the fastening means serve to make good electrical contact between the spring member 1 and the end 4 of the conductor. While I have shown the fastening means in the form of metal bands or clips illustrated at 6 and 7, other forms of fastening devices may be employed: for example, copper or other wire may be wrapped around the arm 3 of the spring member and the end of the conductor to bind these parts together.

In Figures 2 to 5 inclusive, the spring member 1 and parts associated therewith are shown covered with a protective acid resisting sheath 9. I prefer to apply this sheath so as to cover all corrodable metal parts, and in the drawing, the sheath is illustrated as covering not only the spring member 1, but also the end 4 of the cable and the fastening devices 6 and 7. Thus, there are no exposed parts which can become corroded by the acid of the battery, and the connecter presents a neat appearance, for all of the associated parts of the device are concealed by the smooth acid resisting sheath.

In order to apply the conductor to a storage battery terminal, it is merely necessary to separate the arms 3 and 3', thereby enlarging the curved base portion of the U-shaped member to such an extent as to permit the same to encircle the battery terminal; then upon releasing the flexed spring member, the device grips the terminal with the acid resisting sheath making an efficient electrical contact with the same.

I prefer to assemble the parts as shown in Figure 1 and then apply, as by dipping, a thin coating of tin 9' to all of the exposed metal parts. Thereafter a coating of lead or other soft acid resisting metal is applied to the tin coated parts, as by dipping the device in the molten metal or by molding the metal around the tin coated parts of the device. Where lead is employed, the molten lead melts the tin 9', at least to some extent, and the resulting solder serves to unite the lead with the underlying parts to form a non-stripping sheath which will not become separated from the spring member or any other parts of the device, even though the spring member is subjected to considerable bending in applying the same to the storage battery terminal. The spring tension in the spring member should be great enough to bend the protective sheath readily whenever the spring is released from a flexed or bent position. For example, I have found it quite satisfactory to make the spring out of strip steel stock 1/8 of an inch in thickness and to coat the spring member with a layer of lead 3/32 of an inch in thickness. These dimensions are given merely as an illustration of proportions which have been found to be suitable. The invention is not, however, limited to the use of such dimensions, the important consideration being that the spring tension should be sufficient to bend the sheath to the extent necessary to form a firm contact with the battery terminal. If it is desired to render the lead hard enough to prevent the sheath from becoming battered to any considerable extent by hard usage, .2% to .5% of arsenic may be alloyed with the lead to increase its hardness. In this event, however, due to the greater stiffness of the lead sheath, it is advisable to use a correspondingly heavier spring member.

I have found that the molten metal does not destroy the temper of the spring member. The lead may be heated more than 100° C. above the melting point of the same before the molten metal has any noticeable effect upon the temper of the spring, and it is not necessary to employ a temperature as high as this.

The lead sheath may be applied by dipping or by a molding operation, preferably the latter.

In Figures 6 and 7, I have illustrated other embodiments of my invention by way of pointing out some of the numerous ways in which my invention may be applied. The device of Figure 6 comprises a substantially U-shaped spring member 10, arranged at substantially right angles to a cable or conductor 11 and secured thereto by a fastening clip 12. An acid resisting sheath 13 encloses the spring member, the fastening device 12 and the end of the conductor 11. This device is adapted to be applied to a storage battery terminal by merely separating the two arms 14 and 15 of the spring member and then releasing them after the curved base 16 of the spring member has been placed around the battery terminal. The embodiment of the invention illustrated in Figure 6 has some advantages over that shown in Figures 1 to 5 inclusive. The arrangement of the parts is such that the device is more convenient to use than that shown in Figures 1 to 5 inclusive; the offset arms or jaws make it adaptable to more types of battery boxes and batteries than is the case with the form of the invention previously described. Furthermore, the embodiment of Figure 6 is cheaper to manufacture since it requires fewer parts and less material than the device of Figures 1 to 5 inclusive. Also the die casting machine or mold suitable for making the device of Figure 6 is less complicated than the corresponding device which may be used in making the embodiment of Figures 1 to 5. It is to be understood that except for the specific arrangement of the parts, the device of Figure 6 can be made by the method described in connection with the other figures of the drawing. The spring member and associated parts of Figure 6 are preferably coated with tin, as shown at 9', before applying the acid resisting sheath, and this can be done in the manner described in connection with the other figures.

The device of Figure 7 is similar to that shown in Figure 6 except that the spring member 10 is connected to the end of the cable so that the arms 14 and 15 of the spring member extend substantially parallel to the cable. A fastening clip 16' (illustrated more in detail in Figure 8) serves to secure the spring member to the end of the cable 11. The fastening member 16 comprises a portion 17 adapted to grip the cable and a pair of arms 18 and 19 having bent ends engaging the base of the spring member. In other respects, the device of Figure 7 is the same as that shown in the other figures.

My invention is particularly suitable for use on automobile storage batteries because of the small dimensions of the device, because no screw threaded securing means need be employed, and also because of the efficient electrical connection established between the storage battery terminals and the cables or conductors leading thereto. My improved connecter can be made at low cost and is susceptible of quantity production. The several parts of the device are very inexpensive and they can be assembled by unskilled labor or by automatic machinery at very low cost. For example, one man operating a mold can apply the sheath to as many as twelve or fifteen hundred connecters in an hour.

It is to be understood that my invention is not limited to the particular details illustrated and described, but includes such modifications thereof as fall within the scope of the appended claims.

I claim:

1. A heavy duty battery terminal comprising an open ended member made of spring material having considerable resiliency, said member including a battery terminal engaging portion having a substantially circular opening into which a battery terminal is received, said opening being, when the battery terminal engaging portion is in normal position, of a smaller diameter than the battery terminal which is to be received thereinto so that the spring material alone will cause the battery terminal engaging portion to engage the battery terminal with sufficient pressure to make a good electrical connection, the open ends of said member being in relatively close proximity to each other and having opposed tool-engaging surfaces, whereby said portion may, by separating the ends, be flexed to cause the opening therein to become larger than the battery terminal so that the terminal may be inserted into said opening, said member being coated with an acid resisting sheath, said opposed tool-engaging surfaces of the ends normally being convergent, but substantially parallel to each other when the device is in engagement with the battery terminal.

2. A heavy duty battery terminal comprising a substantially U-shaped member made of spring material having considerable resiliency, said member including a battery terminal engaging portion having a substantially circular opening into which a battery terminal is received, said opening being, when the battery terminal engaging portion is in normal position, of a smaller diameter than the battery terminal which is to be received thereinto so that the spring material alone will cause the battery terminal engaging portion to engage the battery terminal wih sufficient pressure to make a good electrical connection, and arms integral with said battery engaging portion and extending away from the same in relatively close proximity to each other and having opposed tool-engaging surfaces, whereby said portion may, by separating the arms, be flexed to cause the opening therein to become larger than the battery terminal so that the terminal may be inserted into said opening, said member being coated with an acid resistant sheath.

3. A heavy duty battery terminal comprising a substantially U-shaped member made of spring material having considerable resiliency, said member including a battery terminal engaging portion having a substantially circular opening into which a battery terminal is received, said opening being, when the battery terminal engaging portion is in normal position, of a smaller diameter than the battery terminal which is to be received thereinto so that the spring material alone will cause the battery terminal engaging portion to engage the battery terminal with sufficient pressure to make a good electrical connection, and arms integral with said battery engaging portion and extending away from the same in relatively close proximity to each other and having opposed tool-engaging surfaces, whereby said portion may, by separating the arms, be flexed to cause the opening therein to become larger than the battery terminal so that the terminal may be inserted into said opening, said member being coated with a layer of lead.

4. The combination of a cable and a battery terminal secured to the end thereof, the said terminal comprising a substantially U-shaped member of spring material having considerable resiliency, said member including a battery terminal engaging portion having a substantially circular opening into which a battery terminal is received, said opening being, when the battery terminal engaging portion is in normal position, of a smaller diameter than the battery terminal which is to be received thereinto so that the spring material alone will cause the battery terminal engaging portion to engage the battery terminal with sufficient pressure to make a good electrical connection, and a pair of arms integral with said battery engaging portion with both arms extending away from the same and away from the end of the cable in relatively close proximity to each other and having opposed tool engaging surfaces, whereby said portion may, by separating the arms be flexed to cause the opening therein to become larger than the battery terminal so that the terminal may be inserted into said opening, said member being coated with an acid resisting sheath.

In testimony whereof I affix my signature.

MORRIS MATSEN.